United States Patent Office 3,404,985
Patented Oct. 8, 1968

3,404,985
LIQUID SHORTENING
Rudolf G. K. Strobel, Colerain Township, Hamilton County, Ohio, assignor to The Procter & Gamble Company, Cincinnati, Ohio, a corporation of Ohio
No Drawing. Filed June 29, 1965, Ser. No. 468,108
10 Claims. (Cl. 99—92)

ABSTRACT OF THE DISCLOSURE

Liquid shortening useful for baking containing about 0.5 to 15% by weight of the shortening of alpha phase crystal tending emulsifier such as propylene glycol monostearate and about 0.25 to 2% of preformed oil-soluble stannous or polytitanyl salts of saturated fatty acids having about 14 to 22 carbon atoms.

---

This invention relates to a novel shortening composition. More particularly, this invention relates to a liquid shortening made from edible oils and fats which is capable of producing excellent quality cakes having high volume and fine grain.

A large variety of shortenings are available on the market today for various cooking and other food purposes. Most of these shortenings are essentially glycerides generally derived from animal, vegetable and marine fats and oils.

Although the animal fats, such as butterfat, lard and tallow, generally are solid or "plastic" in consistency, the naturally-occurring vegetable oils, such as olive, corn, peanut, soybean and cottonseed oils, are generally liquid in consistency. These naturally-occurring liquid vegetable oils are of great importance as cooking and salad oils but frequently are not best suited for certain important baking purposes, for example, the preparation of bakery products which require the production of a highly developed dough or batter structure, such as a high-ratio layer cake having a sugar to flour ratio in excess of 1:1. In order to be made more useful for such purposes, these liquid oils are usually subjected to special chemical and physical processing or combined with certain edible additives which fortify the oil.

A common practice for improving the cake baking properties of the naturally-occurring liquid glyceride oils is to hydrogenate or harden the liquid oil and/or to subject the oil to special crystallizing treatment to provide a solid or plastic shortening. Another common method for imparting plastic consistency to the naturally-occurring liquid glyceride oils and/or for improving the baking characteristics of these oils is to blend the oil with fully hydrogenated solid fats and/or high melting mono- and diglycerides.

Since the ordinary solid or plastic shortenings are not fluid or pourable at ordinary room temperatures, difficulty is encountered in dispensing, measuring, and mixing these shortenings with other substances such as conventional batter and dough ingredients. Accordingly, certain advantages reside in the use of liquid shortenings over the plastic shortenings in ease of handling, measurement, and other usage. It is known that suitable liquid shortenings for cake-baking purposes can be prepared by controlling the amount of fully hydrogenated solid fats and/or high melting mono- and diglycerides employed in, or formed in, the base oil. An example of such a liquid shortening is taught by Andre and Going, U.S.P. 2,815,286, granted December 3, 1957.

Other additives have also been suggested for use in liquid shortenings to provide desirable cake-baking properties, for example, propylene glycol monoesters as taught by Howard, U.S.P. 3,145,108, and Abbott, U.S.P. 3,145,110, both granted August 18, 1964. The former patent teaches, among other things, the combination of propylene glycol monoesters and free fatty acids; the latter patent teaches, among other things, the combination of propylene glycol monoesters, free fatty acids and fully hydrogenated solid fats in beta-phase.

In the co-pending application of Strobel, U.S. Ser. No. 321,436, filed Nov. 5, 1963, now U.S. Patent No. 3,268,-338, there are disclosed novel shortenings, cake mixes and cake batter systems containing a ternary combination of certain alpha-phase crystal-tending emulsifiers, high temperature batter stabilizers and water-soluble polyvalent metal ion salts. It now has been unexpectedly discovered that in the particular case of two preformed salts which are mentioned in the above co-pending application, excellent cake baking results can be obtained with a liquid shortening containing certain alpha-phase crystal-tending emulsifiers and at least one of these two preformed salts in the absence of the high temperature batter stabilizer. The particular salts taught in the foregoing Strobel application which can be used for this purpose are stannous stearate and polytitanyl stearate. Both of these salts are oil-soluble as distinguished from many of the other salts taught in the foregoing Strobel application which are essentially oil-insoluble.

Accordingly, it is an object of this invention to provide a novel liquid shortening which is capable of producing stable cake batters and excellent quality cakes having high volume and fine grain.

It is another object of this invention to provide a liquid shortening which is suitable for cake baking and which depends upon the use of a combination of certain alpha-phase crystal-tending emulsifiers and preformed oil-soluble polyvalent metal ion salts for its cake baking properties.

Other objects and advantages will be apparent from the disclosure herein.

It is known that metal salts of saturated and unsaturated fatty acids such as lithium, sodium, potassium, copper, rubidium, cesium, magnesium, calcium, zinc, strontium, cadmium, aluminum, titanium, tin, manganese, iron, cobalt, nickel, and thalium salts of isovaleric, pivalic, caprylic, palmitic, stearic, cerotic, mellissic, caproleic, oleic and selacholeic acids, and so forth, are useful additives for cakes of the foam batter or nonshortening type. Such use is taught by Finucane, U.S.P. 2,776,893, granted Jan. 8, 1957. It is also known that the alkali metal and alkaline earth metal salts of higher fatty acids such as the sodium, potassium, and calcium salts of oleic, stearic, and palmitic acid are useful agents for layer cakes of the so-called "high-ratio" variety. Such use is taught by Coith, Richardson, and Votaw, U.S.P. 2,123,880, granted July 19, 1938. It is further known that minor amounts of the alkali metal salts of higher fatty acids such as the sodium and potassium salts of oleic, stearic and palmitic acids can be used as emulsifying agents in shortenings containing propylene glycol monoesters. Such use is taught by Jaeger, U.S.P.'s 2,508,393, granted May 23, 1950, and 2,611,704, granted September 23, 1952. None of this art teaches the present critical use of the oil-soluble stannous and polytitanyl saturated higher fatty acid salts in a liquid shortening as cake batter stabilizers in combination with the diol monoesters of saturated higher fatty acid as hereinafter further defined.

In general, the present invention comprises a liquid shortening containing as additives in a liquid glyceride base oil, by weight of the shortening, from about 0.5% to about 15% of at least one alpha-phase crystal-tending emulsifier selected from the group consisting of monoesters of straight chain aliphatic diol with saturated fatty acid, said diol containing from 3 to 5 carbon atoms and said saturated fatty acid containing from about 14 to about 22 carbon atoms and from about 0.25% to about 2% of at least one preformed oil-soluble polyvalent metal ion salt selected from the group consisting of stannous and polytitanyl salts of saturated higher fatty acids having from about 14 to about 22 carbon atoms.

The alpha-phase crystal-tending emulsifiers used in this invention include propylene glycol monostearate; 1,3-propanediol monostearate; 1,4-butanediol monostearate; 1,3-butanediol monostearate; 1,5-pentanediol monostearate; and the corresponding monoesters of the preceding named diols with myristic, palmitic, arachidic and behenic acids. These monoesters can be prepared by direct esterification or interesterification of the diol by reaction with the desired fatty acid or a fatty ester of a monohydric or polyhydric alcohol under appropriate conditions of temperature, either with or without catalyst and/or solvent. Detailed procedures for preparing the alpha-phase crystal-tending emulsifiers of this invention can be found in the aforementioned Howard patent, U.S.P. 3,145,108.

It will be understood that in some preparations of the monoester, mixtures of mono- and diester will be formed. Such mixtures can be used; however, the concentration of the monoester in the shortening must be from about 0.5% to about 15% by weight of the shortening.

A preferred concentration range of alpha-phase crystal-tending emulsifier in the shortening is from about 5% to about 10% by weight of the shortening. A preferred monoester is propylene glycol monostearate.

The stannous and polytitanyl salts of stearic acid and other saturated higher fatty acids having from about 14 to about 22 carbon atoms which are used in this invention are preformed compounds. The term "polytitanyl salts of stearic acid and other higher fatty acids" as used herein is meant to define the polymeric hydroxyl-containing titanium carboxylates and the polymeric titanium carboxylates described in Balthis, U.S.P. 2,621,194, and Haslam, U.S.P. 2,621,195, granted December 9, 1952, in which the saturated fatty acid groups have from about 14 to about 22 carbon atoms. The stannous and polytitanyl stearates are preferably prepared according to methods as follows:

(a) *Stannous stearate.*—This compound is prepared according to the procedure described in Voss et al., German Auslegeschrift 1,112,293, published August 3, 1961. The procedure involves precipitation of Sn(II)-hydroxide from aqueous solution of Sn(II)-salts with aqueous ammonia, reaction of the precipitate with an excess of purified stearic acid, in the presence of silicone oil and at a temperature of about 180° C. to 200° C, and separation of the stannous stearate from Sn(IV) compounds and other by-products.

(b) *Polytitanyl stearate.*—This polymeric compound is prepared according to the procedure described in Balthis, U.S.P. 2,621,194, granted December 9, 1952. The procedure involves reaction in the presence of a suitable acid acceptor (such as triethylamine)), titanium tetrahalide, stearic acid, and at least one mol of water per mol of the original titanium tetrahalide, and thereafter recovering the polytitanyl stearate.

A more detailed description of the methods for preparing stannous stearate and polytitanyl stearate can be found in the above-mentioned references and the examples set forth hereinafter. The stannous and polytitanyl salts of other saturated higher fatty acids used in this invention are prepared by analogous reactions by using other fatty acids such as myristic, palmitic, arachidic, and behenic acids in place of stearic acid.

The preferred concentration of the stannous stearate is about 2% and of the polytitanyl stearate is about 0.5%, both by weight of the shortening.

The base oil in which the additives of this invention are emplayed is a normally liquid glyceride oil. Suitable base oils can be derived from animal, vegetable, or marine sources including naturally-occurring liquid triglyceride oils such as cottonseed, soybean, rapeseed, safflower, sesame seed, sunflower seed, peanut, olive, sardine and herring oils. Also, suitable liquid oil fractions can be obtained from palm oil, lard and tallow, as for example, by fractional crystallization or interesterification with simultaneous crystallization of insoluble glycerides, followed by separation of the liquid oil fraction. These oils are preferably refined, bleached, and deodorized to make them better suited for shortening purposes. Oils predominating in glycerides of unsaturated acids may require partial hydrogenation to prevent flavor reversion during extended storage periods. Refined, bleached and deodorized cottonseed oil and refined, bleached, deodorized and partially hydrogenated soybean oil (iodine value of about 110±10) are specific examples of oils that have been found to be very suitable as glyceride base oils in the practice of this invention.

The alpha-phase crystal-tending emulsifiers and oil-soluble polyvalent metal ion salt can be incorporated in the shortening by physically admixing them into the liquid glyceride base oil. It is preferable to form a solution of the additives in the liquid base oil and this may require elevation of temperature and/or prolonged holding times to dissolve the additives. For example, heating to a temperature of from about 120° F. to about 200° F. and/or holding for about a few minutes to about 15 minutes may be desirable to facilitate dissolving of the additives in the liquid base oil.

The liquid shortening of this invention can also contain small amounts such as up to about 10%, by weight, of conventional emulsifiers such as the partial esters of glycerol and higher fatty acids, for example, monoglycerides. Minor ingredients such as flavor, color and anti-oxidants such as BHA, BHT and methyl silicone can also be employed in the shortening of this invention for their normal purposes.

All kinds of cakes can be baked with the liquid shortening of this invention such as white, yellow, chocolate, spice and devil's food cake as well as pound cakes. Such cakes generally comprise the instant shortening, sugar and flour, for example, such as from about 8% to about 20% shortening, from about 35% to about 45% sugar, and from about 30% to about 45% flour, dry ingredient weight basis. The shortening of this invention can also be used for other general purpose baking such as the baking of breads, biscuits, sweet yeast breads and pie doughs. It is also useful for the preparation of flat type baker's icings.

According to one aspect of this invention, the liquid shortening containing the polytitanyl stearate is particularly useful for the preparation of high volume cakes made with unbleached flour in place of the more usual bleached flour. The conventional chlorination of flour exerts two different effects upon the flour: (1) it bleaches the flour by means of destruction of flour pigments (carotenes) and, thereby, makes the flour appear white; (2) it chlorinates the lipids in the lipid layer surrounding the starch granules and, thereby, makes the starch granules more lipophilic than the starch granules of unbleached flour. Although it is not intended to be bound by theory, it is believed that the lipid layer is desirably removed from the starch granules and incorporated into the oil phase of the cake batter to achieve a stable batter and cake of high volume. In general, the chlorinated lipid layer of bleached flour is more readily removed by the shortening and emulsifiers added to the cake batter than the non-chlorinated lipid layer of unbleached flour. Consequently, it is customary to use bleached flour in the cake baking art since cakes made with such flour tend to have a greater volume and a better appearance than cakes made with unbleached flour. Unexpectedly, it was found that by the use of the polytitanyl stearate herein defined, cakes could be made with unbleached flour having as great a volume and as good an appearance as cakes made from the customary bleached cake flour.

The following examples further illustrate the invention, but the invention is not limited to these specific examples. All percentages and parts are by weight unless otherwise specified.

EXAMPLE 1

A fluid shortening was prepared by mixing together with slight warming at about 120° F. for three minutes the following materials in the stated amounts:

| | Percent by weight |
|---|---|
| Refined, bleached and deodorized liquid cottonseed oil | 85.5 |
| Propylene glycol stearate (approximately 1/2 each mono- and diesters) | 14 |
| Stannous stearate | 0.5 |

The stannous stearate was prepared according to the following procedure:

Twenty-two and six-tenths grams of $SnCl_2$ was dissolved in 50 cc. water (acidified with HCl to prevent precipitation). Aqueous ammonia was added to completely precipitate $Sn(OH)_2$. The precipitate was water washed and then reacted with 58.8 grams of purified stearic acid (excess) at 180° C. in the presence of 0.1 gram of silicone oil. Sn(IV) compounds and other by-products were separated from the reaction mixture by dispersion in toluene. The toluene insoluble fraction was filtered and evaporation of the toluene solution yielded a white product of stannous stearate.

The above fluid shortening was used to prepare a high-ratio white cake consisting of the following ingredients:

| | Parts by weight, g. |
|---|---|
| Cake flour (bleached) | 107.0 |
| Granulated sugar | 133.0 |
| Salt (NaCl) | 2.5 |
| Double-acting baking powder | 6.8 |
| Shortening | 47.5 |
| Whole milk | 130.0 |
| Egg whites (fresh) | 60.0 |

The fluid shortening and the other liquid ingredients (milk and egg whites) were added to all of the dry mix ingredients and simultaneously mixed together with a "Sunbeam" table model electric mixer at 500 r.p.m. for a total of 4 minutes. 400 grams of batter were placed in an 8-inch round cake pan and baked in an oven at 365° F. for about 25 minutes.

The cake volume in cc. per 400 grams of batter was 1640 immediately after removal of the cake from the oven (hot volume) and 1490 after the cake had cooled for about 15 minutes (cold volume). The cake had a very fine grain and a slightly mounded contour by which the center of the cake was 4 millimeters higher than the edge of the cake. By way of comparison, similarly prepared and baked cakes containing shortenings which consisted of (1) cottonseed oil or (2) cottonseed oil containing only the propylene glycol ester or (3) cottonseed oil containing only the stannous stearate, respectively, all had cold volumes of less than 900 cc. per 400 grams of batter and coarse, poorly developed cellular structures.

Similar high volume, fine grained cakes are obtained as in Example 1 when partially hydrogenated soybean oil (iodine value 107) is substituted for the cottonseed oil and when a yellow cake formula is used in place of the white cake formula by substituting 48 grams of whole eggs for the 60 grams of egg whites. Substantially similar cakes are also obtained when preformed stannous palmitate and stannous behenate are substituted for the stannous stearate in the above example.

EXAMPLE 2

The procedure of Example 1 was repeated except that polytitanyl stearate was substituted for stannous stearate in the shortening component of the cake formula. The polytitanyl stearate was prepared according to the following procedure:

Two hundred sixty-four grams (0.9279 mol) of stearic acid was suspended in 900 cc. of n-heptane, and triethylamine (92.05 grams, 0.9097 mol) was added with stirring. This gave a clear solution. Titanium tetrachloride (50 cc., 0.4548 mol) was added dropwise, and the mixture was stirred on a steam bath for one and one-half hours. Water (8.19 grams, 0.4548 mol), triethylamine (92.05 grams, 0.9097 mol), and n-heptane (450 cc.) were then added and in the order named, and the viscous slurry was stirred for 13 hours on a steam bath. Triethylamine hydrochloride was filtered off, and n-heptane was removed from the combined filtrate and n-heptane washings by heating in vacuo on a steam bath. The product solidified on cooling to a tan solid. It was extracted batchwise with two 500-part portions of acetone to remove Ti-free solids. The product, melting at 54–55° C., was a distearate having the empirical formula:

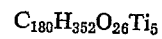

This corresponds to the structure:

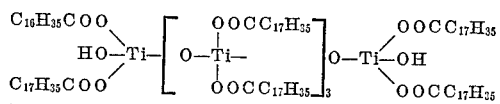

The final cake had a cold volume of 1560 cc. per 400 grams of batter, a fine grain, and a mounded contour in which the height of the cake was 18 millimeters higher at the center than at the edge.

Cakes of substantially similar high volume and fine grain are obtained when similarly prepared and structured performed polytitanyl palmitate and polytitanyl arachidate having from about 2 to about 4 of the bracketed middle units as shown in the above structural formula are substituted for the polytitanyl stearate, and when 1,4-butanediol monopalmitate and propylene glycol monobehenate are substituted for the propylene glycol monostearate in the above example.

EXAMPLE 3

Several concentration series were made with the preformed oil-soluble polyvalent metal ion salts of this invention to illustrate the effective range of concentration of these compounds in the shortening. For this purpose the shortening consisted of the liquid cottonseed base oil as in Example 1 containing 14% propylene glycol stearate (½ each mono- and diesters) and various amounts of preformed oil-soluble polyvalent metal ion salt as shown in the following table, Table I. The high-ratio white cake formula of Example 1 was used in these concentration series.

TABLE I

| Polyvalent metal ion salt | Concentration of salt in shortening | Cake volume, cc./400 g. |
|---|---|---|
| Stannous Stearate | 0.25 | 985 |
| Do | 0.38 | 1,185 |
| Do | 0.50 | 1,490 |
| Do | 2.00 | 1,690 |
| Polytitanyl Stearate | 0.125 | 920 |
| Do | 0.25 | 1,700 |
| Do | 0.50 | 1,560 |
| Do | 1.00 | 1,180 |
| Do | 2.00 | 1,150 |

In general, the concentration of the preformed oil-soluble polyvalent metal ion salt should range from about 0.25% to about 2.00% by weight of the shortening. Concentrations substantially less than 0.25% are insufficient to provide the desirable cake improvements obtained with the liquid shortening of this invention as illustrated in Table I; concentrations substantially greater than 2.00% provide no substantial further improvements and, in some instances, even begin to adversely affect the improvements obtained at 2.00%.

Substantially similar improvements in volume of high-ratio white cakes are obtained with stannous stearate and polytitanyl stearate when the concentration of the propylene glycol monostearate ranges from about 0.5% to about 15% by weight of the shortening.

EXAMPLE 4

In order to illustrate the effectiveness of the preformed oil-soluble polyvalent metal ion salts of this invention in combination with the alpha-phase crystal-tending emulsifier, a comparison was made between (2) the use of 2% stannous stearate and the use of 2% of several oil-insoluble metal ion salts in the shortening component of a cake batter. For this purpose the shortening had a liquid cottonseed oil base and contained 14% propylene glycol stearate (½ each mono- and diesters). The cake formula of Example 1 was used in this comparison. The relative ineffectiveness of these oil-insoluble metal ion salts for purposes of this invention, i.e., for preparing cakes of high volume without use of a high temperature batter stabilizer, was further illustrated by (b) employing 2% (shortening weight basis) of these compounds as additional dry ingredients with the same cake formula. The shortening in this second comparison consisted of liquid cottonseed oil base with 14% propylene glycol stearate (½ each mono- and diesters). The following table, Table II, shows the cake volumes and cake profiles obtained in these comparisons.

TABLE II

| Metal ion salt | Cake volume, cc./400 g. | Cake profile* |
| --- | --- | --- |
| (a) Metal ion salt in shortening component: | | |
| Aluminum stearate | 840 | −9 |
| Calcium stearate | 965 | −5 |
| Ferric stearate | 910 | −8 |
| Stannous stearate | 1,605 | +19 |
| (b) Metal ion salt as dry ingredient: | | |
| Aluminum stearate | 895 | −7 |
| Calcium stearate | 910 | −7 |
| Ferric stearate | 875 | −12 |

*Negative values indicate a dip in center of cake; positive values indicate a mounded contour. 1 unit=1 mm.

EXAMPLE 5

Reference has been made above to the known use of propylene glycol monoesters and free fatty acids in liquid shortenings for cake baking purposes. Such use is taught in Howard U.S.P. 3,145,108. Free fatty acids such as palmitic and stearic acids as well as certain condensation products containing higher fatty acid radicals and free carboxyl groups are disclosed in the Howard patent as useful high temperature batter stabilizers in combination with the propylene glycol monoesters. In view of these teachings it was unexpected that the preformed oil-insoluble polyvalent metal ion salts of saturated higher fatty acids of this invention would provide substantially better performance in cake batters than the corresponding free fatty acids as shown by the comparative results set forth in the following table, Table III. In each of the samples shown in the table the base oil consisted of liquid cottonseed oil and contained 14% propylene glycol stearate (½ each mono- and diesters) and the indicated amount of either stearic acid or stannous stearate. The high-ratio white cake formula of Example 1 was used for this comparative purpose in all samples.

TABLE III

| Concentration of additive in shortening | Stannous stearate cake volume, cc./400 g. | Stearic acid cake volume, cc./400 g. |
| --- | --- | --- |
| 0.25 | 985 | 930 |
| 0.50 | 1,490 | 1,040 |
| 1.00 | (*) | 1,260 |
| 2.00 | 1,690 | 1,150 |

*Not tested.

It has also unexpectedly been found that the use of 0.50% stannous stearate in the liquid shortening of this invention containing the propylene glycol monostearate provides a high ratio white cake volume (1490 cc./400 g.) equivalent to the volume obtained by the combined use of 2.00% free stearic acid and 0.50% stannous chloride in the liquid shortening containing the propylene glycol monostearate. This illustrates the importance of preforming the oil-soluble polyvalent metal ion salts.

EXAMPLE 6

In order to illustrate the particular advantages of polytitanyl stearate in shortenings for cakes made from unbleached flour, high-ratio cakes were prepared and baked as in Example 1 except that unbleached flour was substituted for the bleached flour of that example. In one sample of the present example the shortening consisted of liquid cottonseed base oil containing 14% propylene glycol stearate (½ each mono- and diesters) and 0.5% of the polytitanyl stearate prepared as in Example 2, above. In the other sample the shortening also consisted of liquid cottonseed base oil with 14% propylene glycol stearate (½ each mono- and diesters) but contained, additionally, 2.0% free stearic acid instead of the 0.5% polytitanyl stearate. The cake with the polytitanyl stearate and propylene glycol monostearate had a volume of 1475 cc./400 g. whereas the cake with the free stearic acid and propylene glycol stearate had a volume of 1040 cc./400 g.

This example clearly demonstrates the usefulness of the polytitanyl stearate in shortenings for cakes made from unbleached flour.

Variations and modifications of the present invention can be made upon study of the foregoing disclosure by those skilled in the art. Such variations and modifications are intended to be within the spirit and scope of the invention as defined in the appended claims.

What is claimed is:

1. A liquid shortening containing as additives in a liquid glyceride base oil, by weight of the shortening, from about 0.5% to about 15% of at least one alpha-phase crystal-tending emulsifier selected from the group consisting of monoesters of straight chain aliphatic diol with saturated fatty acid, said diol containing from 3 to 5 carbon atoms and said saturated fatty acid containing from about 14 to about 22 carbon atoms and from about 0.25% to about 2% of at least one preformed oil-soluble polyvalent metal ion salt selected from the group consisting of stannous and polytitanyl salts of saturated higher fatty acids having from about 14 to about 22 carbon atoms.

2. The shortening of claim 1 in which the alpha-phase crystal-tending emulsifier is propylene glycol monostearate.

3. The shortening of claim 1 in which the concentration of the alpha-phase crystal-tending emulsifier is from about 5% to about 10%, by weight of the shortening.

4. The shortening of claim 1 in which the oil-soluble polyvalent metal ion salt is stannous stearate or polytitanyl stearate.

5. The shortening of claim 4 in which the concentration of the stannous stearate is about 2%, by weight of the shortening.

6. The shortening of claim 4 in which the concentration of the polytitanyl stearate is about 0.5%, by weight of the shortening.

7. A liquid shortening containing as additives in a liquid glyceride base oil, by weight of the shortening, from about 5% to about 10% propylene glycol monostearate and about 2% stannous stearate.

8. A liquid shortening containing as additives in a liquid glyceride base oil, by weight of the shortening, from about 5% to about 10% propylene glycol monostearate and about 0.5% polytitanyl stearate.

9. A method of making a cake having a high volume in which the flour is an unbleached flour which comprises employing in the cake a liquid shortening containing as additives in a liquid glyceride base oil, by weight of the shortening, from about 0.5% to about 15%, of at least one alpha-phase crystal-tending emulsifier selected from the group consisting of monoesters of straight chain aliphatic diol with saturated fatty acid, said diol containing from 3 to 5 carbon atoms and said saturated fatty acid containing from about 14 to about 22 carbon atoms and from about 0.25% to about 2% of at least one polytitanyl salt of saturated higher fatty acids having from about 14 to about 22 carbon atoms.

10. The method of claim 9 in which the polytitanyl salt is polytitanyl stearate.

References Cited

UNITED STATES PATENTS

| 2,508,393 | 5/1950 | Jaeger | 99—123 |
| 3,145,108 | 8/1964 | Howard | 99—118 |
| 3,268,338 | 8/1966 | Strobel | 99—92 |

MAURICE W. GREENSTEIN, *Primary Examiner.*